United States Patent
Sonnenberg et al.

(10) Patent No.: US 10,876,720 B2
(45) Date of Patent: Dec. 29, 2020

(54) SNAP-FIT LIGHTING ATTACHMENTS FOR USE IN CONJUNCTION WITH MAGNETIZATION EQUIPMENT DURING NON-DESTRUCTIVE TESTING (NDT)

(71) Applicant: Illinois Tool Works Inc., Glenview, IL (US)

(72) Inventors: Christopher Mark Sonnenberg, Davenport, IA (US); Steven W. Vande Lune, Morrison, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 77 days.

(21) Appl. No.: 16/364,477

(22) Filed: Mar. 26, 2019

(65) Prior Publication Data
US 2020/0309354 A1    Oct. 1, 2020

(51) Int. Cl.
| | |
|---|---|
| G01N 1/02 | (2006.01) |
| F21V 21/08 | (2006.01) |
| H01F 13/00 | (2006.01) |
| G01N 21/25 | (2006.01) |
| H01F 3/00 | (2006.01) |
| F21Y 115/10 | (2016.01) |

(52) U.S. Cl.
CPC ........... *F21V 21/08* (2013.01); *G01N 21/255* (2013.01); *H01F 3/00* (2013.01); *H01F 13/00* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2014/0306697 A1* | 10/2014 | Moser | ................... | G01N 27/84 324/232 |
| 2015/0143929 A1* | 5/2015 | Volckens | ............. | G01N 1/2202 73/863.11 |
| 2016/0245497 A1* | 8/2016 | Arai | ........................ | F21V 29/61 |

FOREIGN PATENT DOCUMENTS

CN    202221039    5/2012

OTHER PUBLICATIONS

Magnaflux: "Yoke Light Kit General Description Y-1 Yoke Light Features and Benefits", Jul. 1, 2014, XP055719830, Retrieved from the Internet: URL:https:llwww.jwjndt.com/wp-content/uploads/2016/01/Yoke_LightKit.pdf.
Nathanael Riess et al: "Helling Non destructive testing", May 23, 2016, XP055719805, Retrieved from the Internet: URL:https://www.helling.de/wp-content/uploads/NDT-Cataloque.pdf.
Magnaflux: "Lightweight, Heavy Duty and Durable Y-2 Yoke", Feb. 8, 2019, XP055719866, Retrieved from the Internet: URL:https://magnaflux.eu/Files/Brochures/y-2_flyer-english.pdf.
International Search Report and Written Opinion for PCT/US2020/024996, dated Aug. 13, 2020, 15 pages.

* cited by examiner

*Primary Examiner* — Elmito Breval
(74) *Attorney, Agent, or Firm* — McAndrews, Held & Malloy, Ltd.

(57) ABSTRACT

Systems and methods are provided for implementing and utilizing lighting attachments for use in conjunction with handheld magnetization equipment during non-destructive testing (NDT). The lighting attachments may incorporate snap-fit based designed, and may be configured for providing lighting based on the magnetization function of the magnetization equipment.

20 Claims, 3 Drawing Sheets

SNAP-FIT LIGHTING ATTACHMENTS FOR USE IN CONJUNCTION WITH MAGNETIZATION EQUIPMENT DURING NON-DESTRUCTIVE TESTING (NDT)

BACKGROUND

Non-destructive testing (NDT) is used to evaluate properties and/or characteristics of material, components, and/or systems without causing damage or altering the tested item. Because non-destructive testing does not permanently alter the article being inspected, it is a highly valuable technique, allowing for savings in cost and/or time when used for product evaluation, troubleshooting, and research. Frequently used non-destructive testing methods include magnetic-particle inspections, eddy-current testing, liquid (or dye) penetrant inspection, radiographic inspection, ultrasonic testing, and visual testing. Non-destructive testing (NDT) is commonly used in such fields as mechanical engineering, petroleum engineering, electrical engineering, systems engineering, aeronautical engineering, medicine, art, and the like.

In some instances, dedicated material and/or products may be used in non-destructive testing. For example, non-destructive testing of particular type of articles may entail applying (e.g., by spraying on, pouring into, passing through, etc.), to the would-be tested article or part, a material that is configured for performing the non-destructive testing. In this regard, such material (referred as "NDT material" or "NDT product" hereinafter) may be selected and/or made based on having particular magnetic, visual, etc. characteristics suitable for the non-destructive testing—e.g., allowing detecting defects and imperfections in the would-be tested article.

One form or type of NDT based inspections is NDT light-based inspections. In this regard, in NDT light-based inspections, light may be used (e.g., in combination with NDT related material applied to the to-be-inspected articles) to inspect for defects. In this regard, the defects may be visually identified based on, e.g., color contrast or some light-related behavior. NDT light-based inspections have their own unique set of challenges, however.

Further limitations and disadvantages of conventional approaches will become apparent to one management of skill in the art, through comparison of such approaches with some aspects of the present method and system set forth in the remainder of this disclosure with reference to the drawings.

BRIEF SUMMARY

Aspects of the present disclosure relate to product testing and inspection. More specifically, various implementations in accordance with the present disclosure are directed to lighting attachments for use in conjunction with magnetization equipment during non-destructive testing (NDT), substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Figure 1:
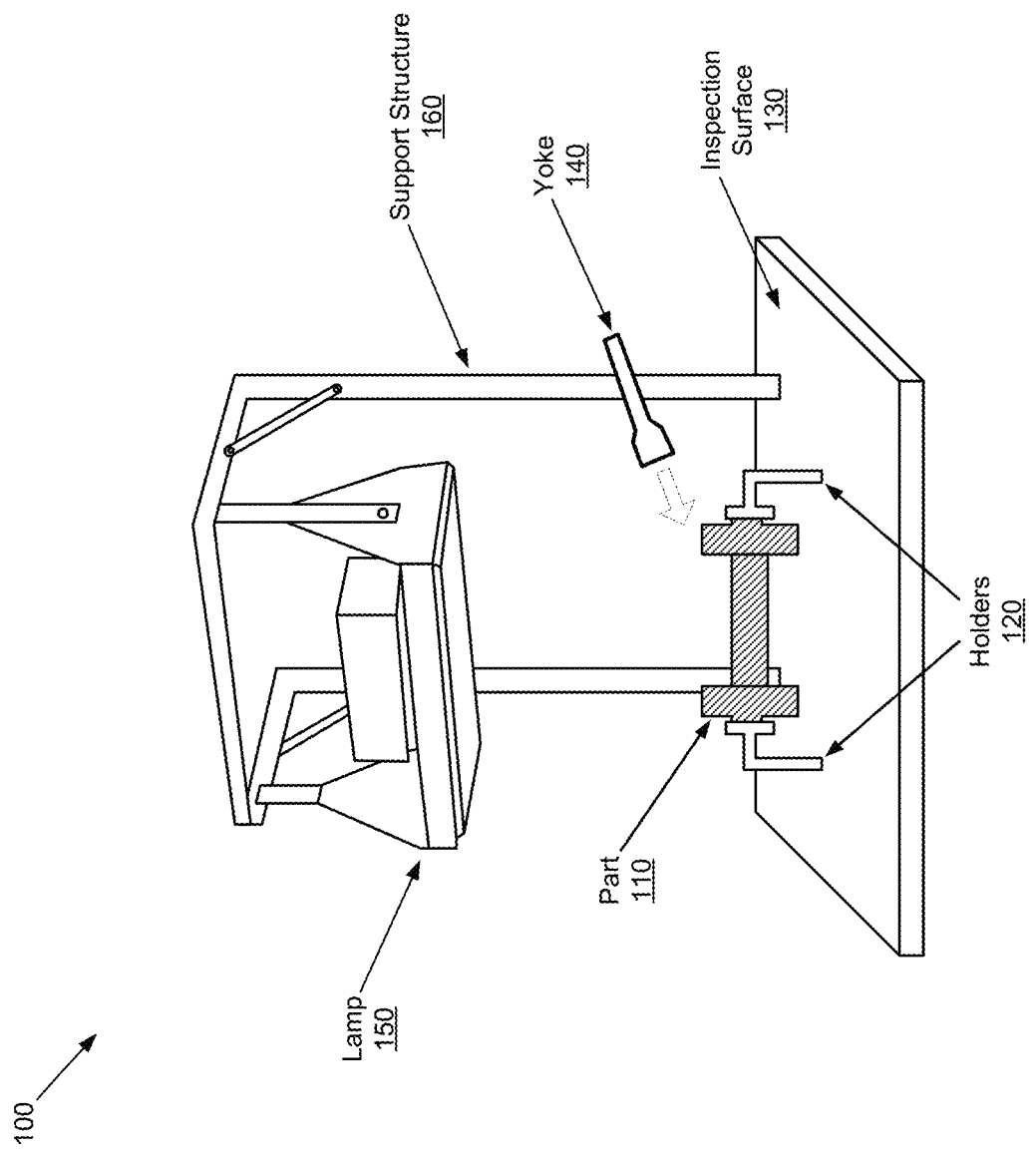
FIG. 1 illustrates an example non-destructive testing (NDT) based inspection setup in which an electromagnetic yoke may be used, which be configured for operation in accordance with the present disclosure.

Various implementations in accordance with the present disclosure are directed to providing enhanced magnetization based non-destructive testing (NDT) inspections, by use of lighting attachments that may be attached to handheld magnetization equipment. In this regard, conventional solutions if any existing for providing lighting during magnetization based non-destructive testing (NDT) inspections when using handheld magnetization equipment (e.g., yokes) suffer from various shortcomings that may hinder the effectiveness and/or cost of such NDT inspections. For example, any existing lighting attachments may require signification disassembly and reassembly, may require additional parts and/or changes to the handheld magnetization equipment, and/or may require use of power supply sources. Accordingly, implementations in accordance with the present disclosure overcome at least some of these shortcomings in cost effective manner.

An example non-destructive testing (NDT) apparatus in accordance with the present disclosure may include handheld magnetization equipment configured for magnetizing surfaces during magnetic particle based non-destructive testing (NDT) inspections, and a lighting attachment configured for use in conjunction with the handheld magnetization equipment. The lighting attachment may be configurable to be securely attached to the handheld magnetization equipment, may be removable, may include one or more light emitting elements, configured for projecting light onto the surfaces being inspected, and may be configurable for providing power to the one or more light emitting elements based on operation of the handheld magnetization equipment when magnetizing the surfaces being inspected.

In an example implementation, at least a part of the lighting attachment may have a conformal geometric design to enable it to be securely attached to a corresponding particular part of the handheld magnetization equipment.

In an example implementation, the handheld magnetization equipment may be configured for generating a magnetic field for magnetizing the surfaces being inspected, and the lighting attachment may be configurable for generating based on the magnetic field at least some of the power for the one or more light emitting elements.

In an example implementation, the lighting attachment may include an induction element configured for generating power based on the magnetic field electromagnetic induction.

In an example implementation, the one or more light emitting elements may include light-emitting diode (LED) lighting elements.

In an example implementation, the lighting attachment may include one or more attaching components configured for enabling the lighting attachment to be attached and detached from the handheld magnetization equipment. The one or more attaching components may include at least one attaching component configured to snap onto corresponding protruding extension on the handheld magnetization equipment. The one or more attaching components may be configured to enable securely attaching the lighting attachment to a particular part of the handheld magnetization equipment.

The particular part of the handheld magnetization equipment may include the part positioned closest to the surfaces being inspected during the magnetic particle based non-destructive testing (NDT) inspections.

In an example implementation, the lighting attachment may include a support component configured for maintained tight fit onto the handheld magnetization equipment when the lighting attachment is attached to the handheld magnetization equipment.

An example lighting attachment, for use in conjunction with handheld magnetization equipment during magnetic particle based non-destructive testing (NDT) in accordance with the present disclosure may include one or more light emitting elements, configured for projecting light onto surfaces being inspected, and a power component configured for providing power to the one or more light emitting elements. The lighting attachment may be configured to be securely attached to handheld magnetization equipment, the lighting attachment may be configured to be removable, and the power component may be configurable for generating the power based on operation of the handheld magnetization equipment when magnetizing the surfaces being inspected.

In an example implementation, at least a part of the lighting attachment may have a conformal geometric design to enable it to be securely attached to a corresponding particular part of the handheld magnetization equipment.

In an example implementation, the power component may be configured for generating the power based on a magnetic field generated by the handheld magnetization equipment for magnetizing the surfaces being inspected.

In an example implementation, the power component may be configured for generating the power based on the magnetic field using electromagnetic induction.

In an example implementation, each of the one or more light emitting elements may be a light-emitting diode (LED) lighting element.

In an example implementation, the lighting attachment may include one or more attaching components configured for enabling the lighting attachment to be attached and detached from the handheld magnetization equipment.

The one or more attaching components may include at least one attaching component configured to snap onto corresponding protruding extension on the handheld magnetization equipment. The one or more attaching components are configured to enable securely attaching the lighting attachment to a particular part of the handheld magnetization equipment. The particular part of the handheld magnetization equipment may include the part positioned closest to the surfaces being inspected during the magnetic particle based non-destructive testing (NDT) inspections.

In an example implementation, the lighting attachment may include a support component configured for maintained tight fit onto the handheld magnetization equipment when the lighting attachment may be attached to the handheld magnetization equipment.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

FIG. 1 illustrates an example non-destructive testing (NDT) based inspection setup in which an electromagnetic yoke may be used, which be configured for operation in accordance with the present disclosure. Shown in FIG. 1 is a non-destructive testing (NDT) setup 100, which may be used in performing non-destructive testing (NDT) inspections.

The NDT setup 100 may comprise various components configured for non-destructive testing (NDT) inspection of articles (e.g., machine parts and the like), in accordance with particular NDT inspection methodology and/or techniques. For example, the NDT setup 100 may comprise an inspection surface 130, upon which an article 110 (e.g., a machine part) may be placed for inspection. The part 110 may be secured using holding elements 140, which may be configured to allow securing the part 110, and holding it in place in particular manner, to enable performing NDT inspection thereof in accordance with particular manner, such as based on the particular NDT inspection methodology and/or techniques the NDT setup 100 is configured to support.

For example, the NDT setup 100 may be configured for magnetic-based NDT inspections, which are particularly suitable for use in inspecting ferrous-based articles. In this regard, with magnetic-based NDT inspections, defects and/or irregularities in inspected articles may be identified based on magnetization of the inspected article, such as by exhibiting particular discernable behavior or characteristic in response to the magnetization of the inspected article.

One example method for magnetic-based NDT inspections is the "magnetic particle" method, which may be particularly suitable for identifying discontinuities (flaws) in metal parts and surfaces. In this regard, to perform a magnetic particle NDT inspection, equipment is used to magnetize the surface being examined, and ferrous particles are applied to the magnetized area. This may allow identify any defects, as any discontinuity in the surface, for example, may cause the magnetic flux to leak out of the surface, attracting the particles to that area and making it visible as an indication.

In this regard, the "magnetic particle" based inspections may typically entail visual examination of the inspected articles (e.g., identify any changes caused by defects in response to the magnetization). To that end, the magnetic particles that build up at areas corresponding to defects and/or irregularities in the inspected article (or surface thereof) may be available in several different visible colors, chosen to provide a contrast to the base material.

Accordingly, adequate lighting may be needed in the examination area to make indications readily visible to the inspector for evaluation. However, in many instances magnetic particle inspections typically may be performed in confined spaces or tight areas such that ambient light is not sufficient to perform the examination. Therefore, in such instances, an artificial light source may be needed. In this regard, in most implementations utilizing magnetic particle based inspections, a light source may need to be used, such to project light (e.g., white light, ultraviolet (UV) light, etc.) at the inspected articles, to help identify any defects and/or irregularities.

For example, as shown in FIG. 1, the NDT setup 100 may comprise an inspect lamp 150. In this regard, the lamp 150 may be configured for generating and/or projecting white light and/or UV light. The lamp 150 may be configured to provide light during inspections in optimal manner. For example, as shown in FIG. 1, the lamp 150 may be attached to a support structure 160, such as it may be held above the inspection surface 130 and pointing downwards, so that it may project its light downwards onto the inspection surface 130, thus allowing NDT inspection of articles placed thereon (e.g., the part 110).

Various techniques may be used for magnetizing the inspected articles. One technique is by use of portable devices, which may be used by the user to magnetize the surface of the inspected article. For example, as shown in FIG. 1, an electromagnetic yoke 140 may be used in the NDT setup 100, to magnetize the inspected article 110 while held in place. In this regard, yokes may be electromagnetic handheld devices configured for converting electrical current to magnetic flux, projecting it into inspected articles. For example, the yoke 140 may be configured for converting electrical current to magnetic flux, projecting it into the surface of the inspected article 110 through two legs, which may or may not be articulated to conform to surface geometry.

Use of yokes may pose some challenges and/or raise some issues, however. For example, performing NDT inspections using a yoke may typically entails using the yoke in a manner that may affect other components or devices in the inspection setup. Positioning the yoke to perform an inspection, for example, may block the light (e.g., ambient light and/or light projected by the light source in the setup) needed for the inspection—e.g., to see any indications forming on the surface of the inspected article.

Accordingly, implementations in accordance with the present disclose may provide improved solutions for use of portable devices in NDT inspections, particularly handheld devices (e.g., electromagnetic yokes) that may be used in magnetic particle based NDT inspections, which remedy some of the issues in existing solutions.

For example, in various implementations an accessory device may be used, being configured such that it may be attached to the yoke, to provide illumination while the yoke is being used during the inspection. In this regard, such accessory device may be configured such that it may provide the needed lighting, without adversely affecting the operation of the yoke itself—e.g., without interfering and/or otherwise impacting the magnetization function of the yoke, and without causing significant change to the shape, size, etc. of the yoke (or yoke/accessory combination) as to make the conduct of inspection itself more cumbersome. The accessory device may also be configured such that it may be selectively attachable (and/or detachable), while still providing secure attachment to the yoke—i.e., may be attached (or detached) when necessary, and does so while still ensuring tight engagement with the yoke when attached. Further, the accessory device may also be configured such that it the lighting provided thereby may be powered using the yoke, using the magnetic flux generated thereby. Example implementations of such accessory devices are shown and described with respect to FIGS. 2 and 3, below.

Figure 2:
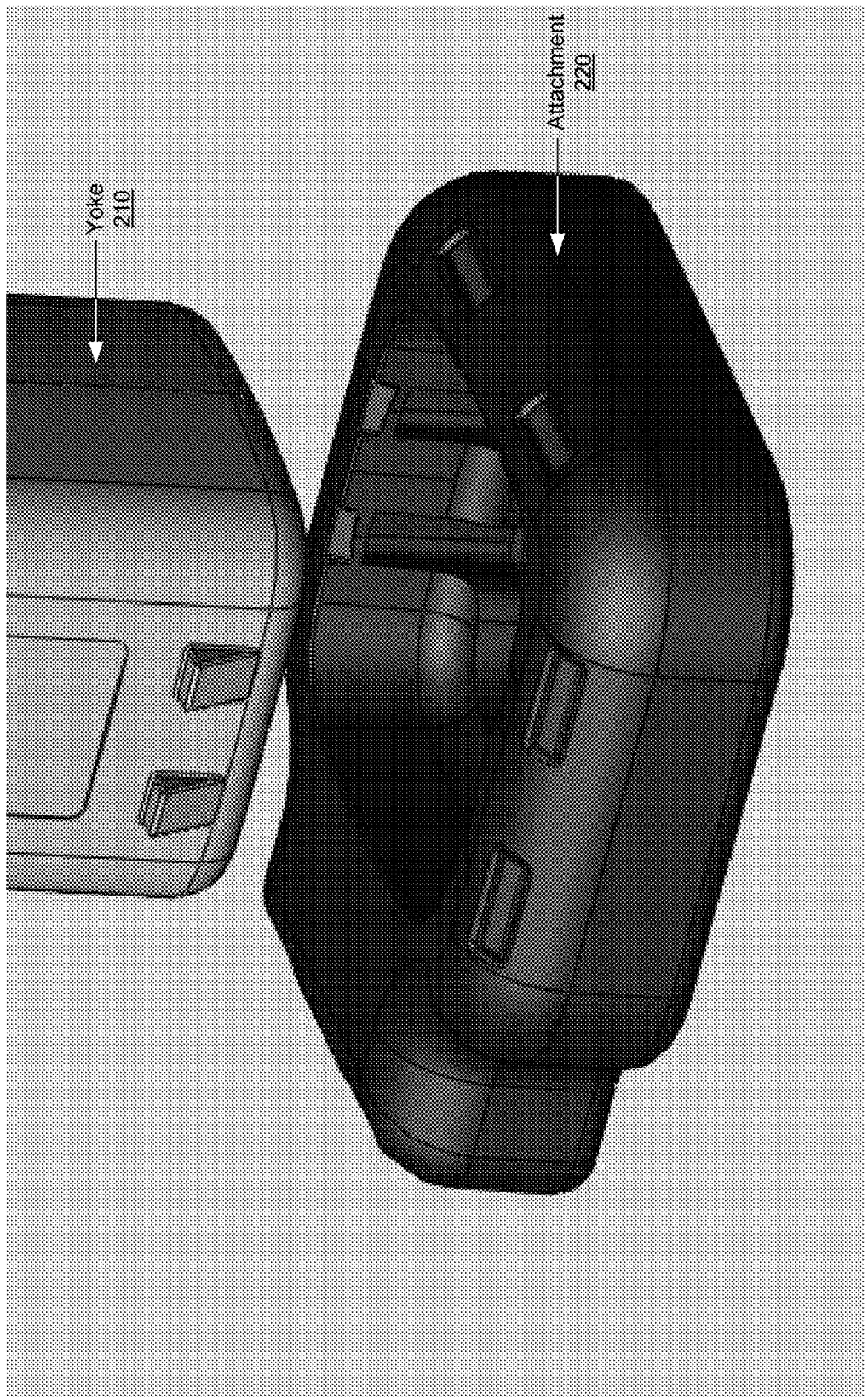
FIG. 2 illustrates an example yoke attachment for use during yoke-based non-destructive testing (NDT) based inspection, in accordance with the present disclosure.

FIG. 2 illustrates an example yoke attachment for use during yoke-based non-destructive testing (NDT) based inspection, in accordance with the present disclosure. Shown in FIG. 2 are a yoke 210 and a yoke attachment 220.

The yoke 210 may correspond to an implementation of the yoke 140 of FIG. 1. In this regard, the yoke 210 may be a handheld electromagnetic device configuring for magnetizing objects, such as during magnetic particle based non-destructive testing (NDT) inspections, as described with respect to FIG. 1. Accordingly, the yoke 210 may comprise any combination of suitable hardware (including circuitry) and software for converting electrical currents to magnetic flux, projecting it into the inspected articles.

The yoke attachment 220 may be configured for application to the yoke 210, to remedy at least some of the issues that arise with use of such devices in NDT inspection, as describe with respect to FIG. 1. In this regard, yoke attachment 220 may be configured such that, when attached to the yoke 210, it may provide illumination while the yoke 210 is being used—e.g., during magnetic particle based NDT inspection.

As noted with respect to FIG. 1, accessory devices in accordance with the present disclosure, such as the yoke attachment 220, may be configured to operate without adversely affecting the operation of the yoke itself. Accordingly, the yoke attachment 220 is designed and/or configured to operate without adversely affecting the operation of the yoke 210. For example, the yoke attachment 220 is designed and/or configured to operate without interfering and/or otherwise impacting the magnetization function of the yoke 210. Further, the yoke attachment 220 is designed for optimal attachment—e.g., when attached to the yoke 210, it does not significantly change the shape, weight, and/or size of the yoke 210 as to make conducting the inspection more cumbersome.

Yoke attachments (such as the yoke attachment 220) may be configured to providing lighting during the NDT inspections, when attached to the yokes. For example, the yoke attachment 220 may incorporate lights at the bottom side (shown in FIG. 3) that project onto the direction in which the yoke 210 is directed. Various types of light (or lighting elements) may be used, including light-emitting diode (LED) lights. In an example implementation, multiple lights (e.g., LED lighting elements) may be used, and configured to operate in a manner that ensures continuous lighting even when using AC current.

Yoke attachments (such as the yoke attachment 220) may be configured to power lighting elements incorporate thereto, without requiring independent power supply. For example, the yoke attachment 220 may be configured to power the lighting provided thereby using the yoke itself, such as using the magnetic flux generated by the yoke for the NDT inspection. For example, the yoke attachment 220 may be configured to generate power (e.g., for its lighting elements) using induced currents from the magnetic flux generated by the yoke 210 when it is energized. The yoke attachment 220 may be designed to maximize the inductive coupling—e.g., being designed to fit against the yoke legs as closely as possible.

The yoke attachment 220 may be configured to provide secure attachment to the yoke—e.g., ensuring tight and secure engagement with the yoke 210 when attached to it. Further, the yoke attachment 220 may be configured for selective attachment and/or detachment (e.g., so that it may be attached to the yoke 210 only when needed and detached/removed from it when not needed), without compromising the time and secure engagement with the yoke 210.

Preferably, yoke attachments (such as the yoke attachment 220) may incorporate a design that allows for quick and simply attachment/detachment—that is, without requiring disassembly and re-assembly of the yoke (or any component thereof—e.g., legs), without necessitating use of special tools, and without requiring using additional parts (e.g., replacement of fastening hardware to accommodate the yoke attachment). Rather, the yoke attachment may be designed such that the user may manually attach them to the yoke, and similarly manually detach them when not needed. Further, the yoke attachments may be designed such that they (and attaching them to the yokes) do not require use of seal or sealant—this is may be desirable because heat would dissipate any fluid, particularly when the yoke/attachment are being used in conjunction with NDT inspections.

In an example implementation, yoke attachments (such as the yoke attachment 220) may utilize a conformal design to ensure that the yoke attachment and the yoke may snap together—that is, provide "snap-fit" engagement, without requiring disassembly and re-assembly, and/or without necessitating use of special tools. This may entail designing the yoke attachments specifically to match particular yokes. Further, in some instances, changes may be made to yoke to ensure such snap-fit engagement. In other words, specific features are designed and/or incorporated into both the yoke attachment and the yoke itself (e.g., the main body housing of the yoke) to accomplish such snap-fit, without the use of any hardware or fasteners. For example, a snap-fit based yoke attachment may be designed to slip over the yoke without requiring to use any tools (e.g., for removing the legs of the yoke) or additional parts. Such snap-fit design would not necessitate use a seal or sealant. An example snap-fit based yoke attachment is described in more details with respect to FIG. 3.

Figure 3:
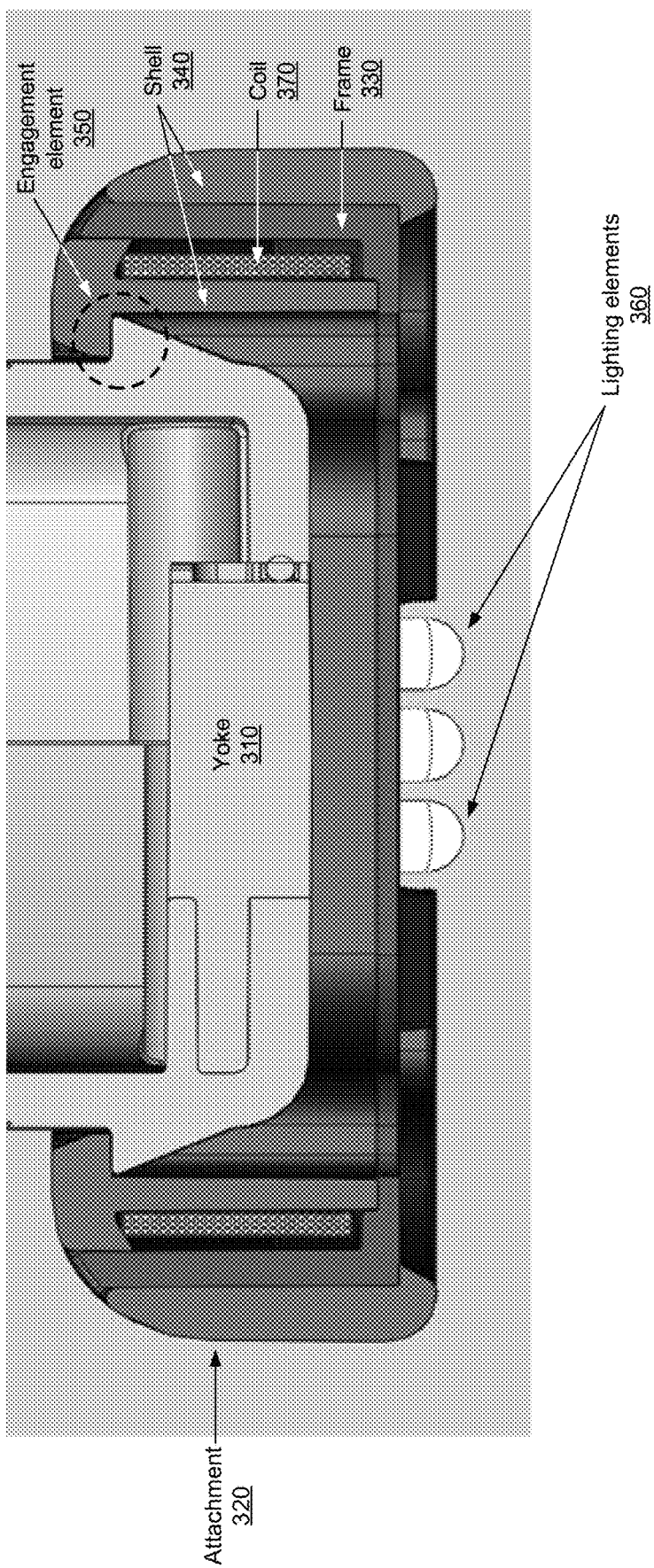
FIG. 3 illustrates a cross-section of an example snap-fit based yoke attachment, in accordance with the present disclosure.

FIG. 3 illustrates a cross-section of an example snap-fit based yoke attachment, in accordance with the present disclosure. Shown in FIG. 3 are a yoke 310 and a yoke attachment 320.

The yoke 310 and the yoke attachment 320 may be similar to the yoke 210 and the yoke attachment 220, as describe with respect to FIG. 2. The yoke attachment 320 may incorporate a snap-fit based design. In this regard, the yoke attachment 320 may utilize a conformal design to ensure that snap onto the yoke 310, providing a tight fit when the yoke attachment 320 and the yoke 310 are snapped onto each other, without requiring use of special tools and/or additional parts. Rather, the yoke attachment 320 may be attached to the yoke 310 manually (e.g., by the user by placing the yoke attachment 320 on the end of the yoke 310, and then pushing it into the yoke 310), snapping onto position as it slips over the yoke 310, without requiring to use any tools or additional parts.

The yoke attachment 320 may incorporate various elements for supporting the snap-fit design. For example, the yoke attachment 320 may incorporate a frame 330 composed of hard material (e.g., resin based), to provide rigid framing and support, thus giving and allowing maintaining the overall shape of the yoke attachment 320. The frame 330 may also be configured to house other components of the yoke attachment 320, such as circuitry, lighting elements, etc. The hard frame 330 may be embedded within and surrounded by a shell 340 composed of soft and elastic material, to provide padding and cushioning, such as to protect the yoke attachment 320 and/or the yoke to which it may be attached during attachment and/or use of the yoke/attachment combination during NDT inspections. Further, the yoke attachment 320 may comprise an engagement element 350 (e.g., implemented as part of the shell 340), to facilitate the snapping of the yoke attachment 320 onto the yoke 310, and then the maintaining of a tight fit with the yoke 310. The engagement element 350 may comprise a lip that would engage a corresponding protrusion in the body of the yoke 310, as shown (as cross section) of the yoke/attachment combination illustrated in FIG. 3

To provide the illuminating function, as describe with respect to FIGS. 1 and 2, the yoke attachment 320 may comprise one or more lighting elements 360, which may be configured to emit light during inspections. The one or more lighting elements 360 may be configured to project light onto the article being inspected, such as by projecting light in the direction in which the yoke 310 is directed. For example, as shown in FIG. 3, the one or more lighting elements 360 may be incorporated to bottom (outer) surface of the yoke attachment 320, and as a resulting may project light in the direction in which the yoke 310 is directed when it is being used to magnetize the inspected article. Nonetheless, the disclosure is not so limited, and in some instances, the light elements may be configured to, alternatively or additionally, generate and/or project light in other directions—e.g., sideway, to enhance ambient lighting conditions around inspect articles.

The one or more lighting elements 360 may preferably be configured to generate and project white light. Nonetheless, the disclosure is not so limited, and in some instances, the light elements may be configured to generate and/or project other types of light (e.g., UV light). Further, in some instances, the light elements may be configured to generate and projects different types of light.

The one or more lighting elements 360 may comprise including light-emitting diode (LED) lighting elements. The disclosure is not so limited, however, and any suitable type of light emitting element may be used. Further, in some instances different types of light emitting elements may be used, to optimize performance.

In an example implementation, multiple lights may be used, and may be particularly configured to operate in a manner (e.g., timing wise) that ensures continuous lighting even when using AC current.

The yoke attachment 320 may be configured to power the lighting elements without requiring independent power supply. For example, the yoke attachment 320 may be configured to power the lighting provided thereby using the yoke 310 itself, such as using the magnetic flux generated by the yoke 310 during NDT inspections. The yoke attachment 320 may incorporate a coil 370, for example, which may be configured to generate induction current when subject to the magnetic flux generated by the yoke 310. The coil 370 may also be implemented such that it may further support the frame 330 by providing added rigidity.

The yoke attachment 320 may also comprise suitable circuitry (not shown) for supporting various functions of yoke attachment 320. The circuitry may be embedded, for example, within the frame 330, such as at the base of the lighting elements 360. In this regard, the circuitry may control the generating of induction current via the coil 370, may manage powering the lighting elements 360 based on the induction current, and/or may control the lighting functions of the lighting elements 360—e.g., to ensure continuous lighting despite the AC nature of the induction current.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. For example, block and/or components of disclosed examples may be combined, divided, re-arranged, and/or otherwise modified. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. An apparatus configured for use in non-destructive testing (NDT), the apparatus comprising:
    handheld magnetization equipment configured for magnetizing surfaces during magnetic particle based non-destructive testing (NDT) inspections; and
    a lighting attachment configured for use in conjunction with the handheld magnetization equipment, wherein:
        the lighting attachment is configured to be securely attached to the handheld magnetization equipment;
        the lighting attachment is removable;
        the lighting attachment comprises one or more light emitting elements, configured for projecting light onto the surfaces being inspected; and
        the lighting attachment is configured to provide power to the one or more light emitting elements based on operation of the handheld magnetization equipment when magnetizing the surfaces being inspected.

2. The apparatus of claim 1, wherein at least a part of the lighting attachment has a conformal geometric design to enable it to be securely attached to a corresponding particular part of the handheld magnetization equipment.

3. The apparatus of claim 1, wherein:
    the handheld magnetization equipment is configured for generating a magnetic field for magnetizing the surfaces being inspected; and
    the lighting attachment is configured for generating based on the magnetic field at least some of the power for the one or more light emitting elements.

4. The apparatus of claim 3, wherein the lighting attachment comprises an induction element configured for generating power based on the magnetic field electromagnetic induction.

5. The apparatus of claim 1, wherein each of the one or more light emitting elements comprises a light-emitting diode (LED).

6. The apparatus of claim 1, wherein the lighting attachment comprises one or more attaching components configured for enabling the lighting attachment to be attached and detached from the handheld magnetization equipment.

7. The apparatus of claim 6, wherein the one or more attaching components comprise at least one attaching component configured to snap onto corresponding protruding extension on the handheld magnetization equipment.

8. The apparatus of claim 6, wherein the one or more attaching components are configured to enable securely attaching the lighting attachment to a particular part of the handheld magnetization equipment.

9. The apparatus of claim 8, wherein the particular part of the handheld magnetization equipment comprises the part positioned closest to the surfaces being inspected during the magnetic particle based non-destructive testing (NDT) inspections.

10. The apparatus of claim 1, wherein the lighting attachment comprises a support component configured for maintained tight fit onto the handheld magnetization equipment when the lighting attachment is attached to the handheld magnetization equipment.

11. A lighting attachment for use in conjunction with handheld magnetization equipment during magnetic particle based non-destructive testing (NDT), the lighting attachment comprising:
    one or more light emitting elements, configured for projecting light onto surfaces being inspected; and
    a power component configured for providing power to the one or more light emitting elements;
    wherein:
        the lighting attachment is configured to be securely attached to a handheld magnetization equipment;
        the lighting attachment is configured to be removable; and the power component is configured to generate power based on operation of the handheld magnetization equipment when magnetizing the surfaces being inspected.

12. The lighting attachment of claim 11, wherein at least a part of the lighting attachment has a conformal geometric design to enable it to be securely attached to a corresponding particular part of the handheld magnetization equipment.

13. The lighting attachment of claim 11, wherein the power component is configured for generating the power based on a magnetic field generated by the handheld magnetization equipment for magnetizing the surfaces being inspected.

14. The lighting attachment of claim 13, wherein the power component is configured for generating the power based on the magnetic field using electromagnetic induction.

15. The lighting attachment of claim 11, wherein each of the one or more light emitting elements comprises a light-emitting diode (LED).

16. The lighting attachment of claim 11, comprising one or more attaching components configured for enabling the lighting attachment to be attached and detached from the handheld magnetization equipment.

17. The lighting attachment of claim 16, wherein the one or more attaching components comprise at least one attaching component configured to snap onto corresponding protruding extension on the handheld magnetization equipment.

18. The lighting attachment of claim 16, wherein the one or more attaching components are configured to enable securely attaching the lighting attachment to a particular part of the handheld magnetization equipment.

19. The lighting attachment of claim 18, wherein the particular part of the handheld magnetization equipment comprises the part positioned closest to the surfaces being inspected during the magnetic particle based non-destructive testing (NDT) inspections.

20. The lighting attachment of claim 11, comprising a support component configured for maintained tight fit onto the handheld magnetization equipment when the lighting attachment is attached to the handheld magnetization equipment.

* * * * *